(12) United States Patent  
Niitsuma et al.

(10) Patent No.: US 9,807,989 B2  
(45) Date of Patent: Nov. 7, 2017

(54) DUAL-BEARING REEL

(71) Applicant: Shimano Inc., Sakai, Osaka (JP)

(72) Inventors: Akira Niitsuma, Osaka (JP); Takeshi Ikuta, Osaka (JP); Kunio Takechi, Osaka (JP); Takuji Takamatsu, Osaka (JP); Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/099,058

(22) Filed: Apr. 14, 2016

(65) Prior Publication Data

US 2016/0345558 A1    Dec. 1, 2016

(30) Foreign Application Priority Data

May 27, 2015    (JP) .................. 2015-107017

(51) Int. Cl.
*A01K 89/015* (2006.01)
*A01K 89/0155* (2006.01)
*F16C 19/54* (2006.01)
*F16C 19/06* (2006.01)

(52) U.S. Cl.
CPC .......... *A01K 89/0155* (2013.01); *F16C 19/06* (2013.01); *F16C 19/54* (2013.01)

(58) Field of Classification Search
CPC .. A01K 89/057; A01K 89/058; A01K 89/059; A01K 89/033
See application file for complete search history.

(56) References Cited

U.S. PATENT DOCUMENTS

| | | | | |
|---|---|---|---|---|
| 5,588,605 | A | * 12/1996 | Yamaguchi | .......... A01K 89/033 242/268 |
| 2006/0138267 | A1 | * 6/2006 | Ikuta | .................... A01K 89/033 242/245 |
| 2009/0127367 | A1 | * 5/2009 | Tsutsumi | ......... A01K 89/01555 242/286 |

FOREIGN PATENT DOCUMENTS

JP    9-275881 A    10/1997

* cited by examiner

*Primary Examiner* — Emmanuel M Marcelo
(74) *Attorney, Agent, or Firm* — Global IP Counselors, LLP

(57) ABSTRACT

A dual-bearing reel, includes a reel body, a spool, a spool shaft, an adjustment member, and an operating lever. The spool is rotatable relative to the reel body. The spool shaft is configured to integrally rotate with the spool. The adjustment member is attached to the reel body and configured to adjust a braking force that brakes the rotation of the spool shaft. The operating lever is detachably attached to the adjustment member so as to extend in a radial direction, and configured to be positionally adjusted in a circumferential direction relative to the adjustment member.

15 Claims, 12 Drawing Sheets

DUAL-BEARING REEL

CROSS-REFERENCE TO RELATED APPLICATIONS

This application claims priority based on Japanese Patent Application No. 2015-107017, filed in the Japan Patent Office on May 27, 2015, the contents of each of which is hereby incorporated herein by reference.

BACKGROUND

Field of the Invention

The present invention relates to a dual-bearing reel.

Background Information

In the dual-bearing reel disclosed in Japanese Laid-Open Patent Publication No. 1997-275861, an operating lever is pivotably attached to a reel body, in order to facilitate the operation, of a casting control mechanism. The braking force with respect to the spool shaft can be adjusted by pivoting the operating lever.

SUMMARY

When adjusting to an appropriate braking force using the operating lever in the dual-bearing reel described above, there are cases in which the operating lever is extended in a direction that is difficult to operate for an angler. For example, if the operating lever is extended in a direction toward the fishing rod mounting side, the operating lever can be difficult for the angler to operate.

The object of the present invention is to provide a dual-bearing reel comprising an operating lever that is easy to operate.

The dual-bearing reel according to one aspect of the present invention comprises a reel body, a spool, a spool shaft, an adjustment member, and an operating lever. The spool is rotatable relative to the reel body. The spool shaft is capable of being integrally rotated with the spool. The adjustment member is attached to the reel body. The adjustment member is configured to adjust the braking force that brakes the rotation of the spool shaft. The operating lever is detachable, and is attached to the adjustment member so as to extend in the radial direction. Positional adjustment of the operating lever is possible in the circumferential direction relative to the adjustment member.

With this configuration, first, the braking force with respect to the spool shaft can be adjusted by the adjustment member. Then, after adjusting to an appropriate braking force, the operating lever can be attached to the adjustment member. Since positional adjustment of the operating lever is possible in the circumferential, direction relative to the adjustment member, the operating lever can be disposed so as to extend in a direction in which operation is easy. For example, the operating lever can be disposed so that fee operating lever will extend in a direction away from the fishing rod, when mounting the dual-bearing reel to the fishing rod.

Preferably, the operating lever is attached to the adjustment member so as to clamp the adjustment member from the radially outer side.

Preferably, the adjustment member comprises multiple recesses disposed at intervals in the circumferential direction on the outer perimeter surface thereof. Then, the operating lever can be attached to each recess.

Preferably, the multiple recesses are arranged in a staggered manner in the circumferential direction.

Preferably, the operating lever comprises a cover portion that is attached so as to cover the outer perimeter surface of the adjustment member, and a lever portion that extends from the cover portion in the radial direction.

Preferably, the adjustment member comprises multiple recesses disposed at intervals in the circumferential direction on the outer perimeter surface thereof. One end of the lever portion is configured to extend through the cover portion and engage each recess.

Preferably, the adjustment member comprises multiple recesses disposed at intervals in the circumferential direction. The cover portion comprises at least one protrusion that engages each recess.

Preferably, the cover portion comprises multiple recesses disposed at intervals in the circumferential direction. The adjustment member comprises at least one protrusion that engages each recess.

Preferably, the lever portion is screwed to the cover portion.

Preferably, the adjustment member comprises a groove that extends in the circumferential direction on the outer perimeter surface thereof. Further, preferably, the operating lever comprises a pin and a biasing part. The pin engages with the groove portion. The biasing part biases the pin toward the groove portion.

Preferably, the cover portion comprises a pair of circumferential ends, and is C-shaped when viewed axially. The lever portion is attached to the pair of circumferential ends so that the pair of circumferential ends approach each other.

Preferably, the lever portion comprises a fitting part that is fitted between the cover portion and the adjustment member.

Preferably, the dual-bearing reel further comprises an annular female screw member. The adjustment member comprises a male threaded portion to which the female screw member is screwed and a flange. The operating lever is sandwiched between the female screw member and the flange.

Preferably, the flange comprises multiple recesses disposed at intervals in the circumferential direction. The operating lever comprises at feast one protrusion that engages each recess.

Preferably, the dual-bearing reel further comprises a one-way clutch. The one-way clutch comprises an outer ring and a rolling body. The outer ring is rotatable relative to the reel body. The rolling body transmits the rotation of the spool shaft in the line delivering direction to the outer ring. The adjustment member adjusts the braking force that brakes the rotation of the outer ring.

According to this configuration, if the spool shaft is rotated in the line delivering (casting) direction, the rotation of the spool shaft is transmitted to the outer ring via the rolling body. That is, the spool shaft and the outer ring are rotated together. Since the outer ring is braked by the adjustment member, the spool shaft is also braked thereby. As a result, the rotation speed of the spool shaft is suppressed at the time of casting to prevent backlash. On the other hand, if the spool shaft is rotated in the line winding (reeling) direction, the rotation of the spool shaft is not transmitted to the outer ring. That is, since the spool shaft and the outer ring are not rotated together, the spool shaft is not braked. Accordingly, it is possible to suppress the generation of rotational resistance in the spool shaft at the time of reeling, and the spool shaft can be rotated smoothly.

According to the present invention, it is possible to dispose the operating lever in a position that is easy to operate.

BRIEF DESCRIPTION OF THE DRAWINGS

Referring now to the attached drawings which form a part of this original disclosure.

DETAILED DESCRIPTION OF THE EMBODIMENTS

Embodiments of the dual-bearing reel according to the present invention will be described below, with reference to the drawings. Meanwhile, the axial direction is the direction in which the spool shaft extends. Further, the radial direction is the radial direction of a circle having with the spool shaft being in the center thereof, and the circumferential direction is the circumferential direction of the circle having the spool shaft in the center thereof.

Figure 1:
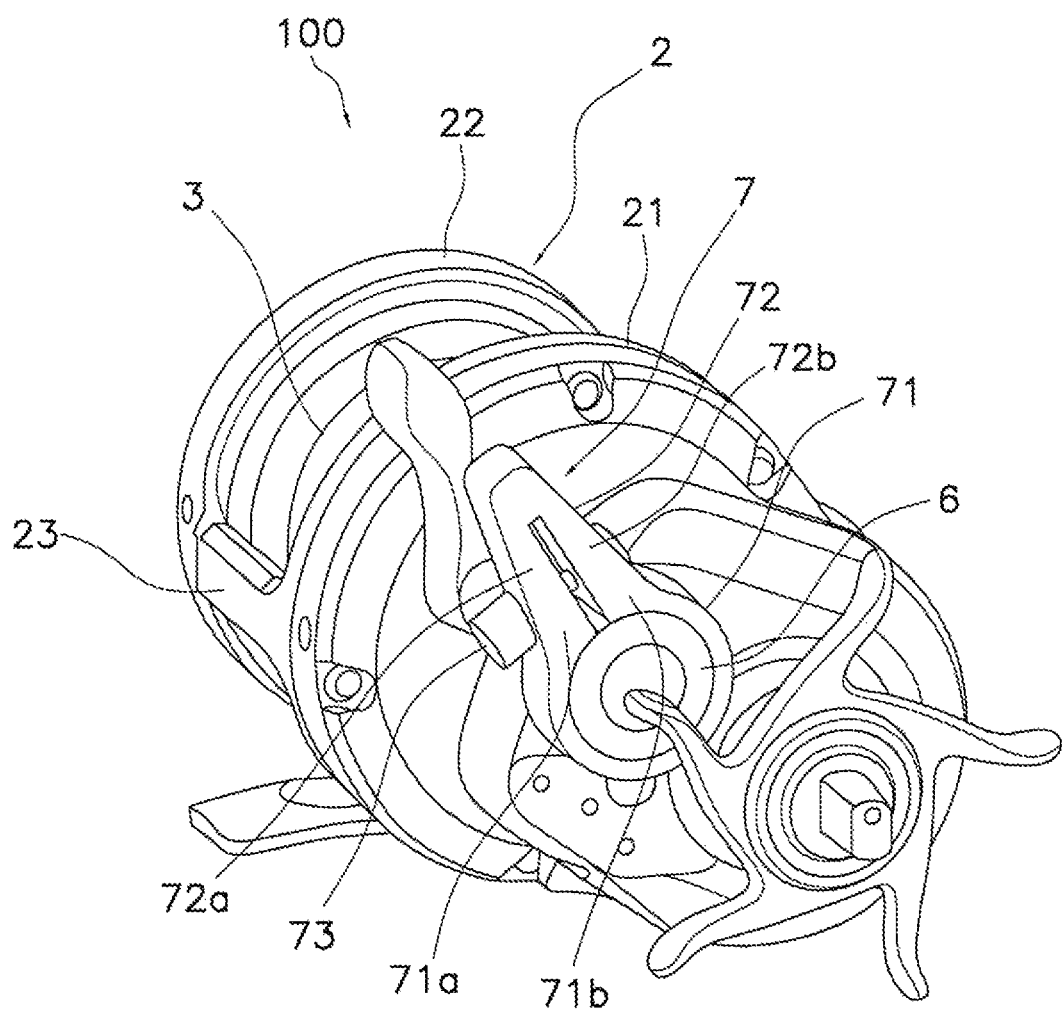
FIG. 1 is a perspective view of a dual bearing reel.
Figure 2:
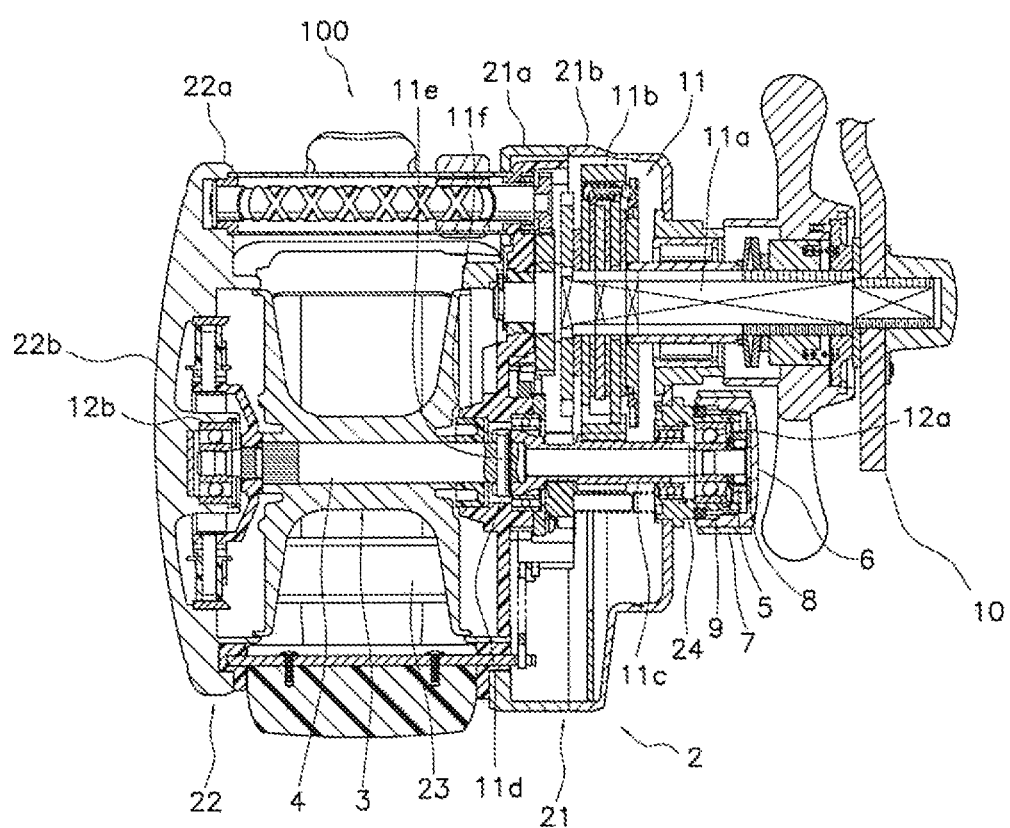
FIG. 2 is a cross-sectional view of the dual bearing reel of FIG. 1.

As shown in FIG. 1 and FIG. 2, the dual-bearing reel 100 comprises a reel body 2, a spool 3, a spool shaft 4, a one-way clutch 5, an adjustment member 6, and an operating lever 7. The dual-bearing reel 100 further comprises a first friction plate 8, a biasing member 9, and a handle 10.

The reel body 2 comprises a first reel body portion 21 and a second reel body portion 22. The first reel body portion 21 and the second reel body portion 22 are disposed at an interval from each other in the axial direction. The first reel body portion 21 and the second reel body portion 22 are coupled to each other via multiple connecting members 23.

As shown in FIG. 2, the first reel body portion 21 comprises a first side plate 21a and a first side cover 21b. The first reel body portion 21 defines a housing space inside. A rotation transmission mechanism 11 and the like are housed in this housing space. The second reel body portion 22 comprises a second side plate 22a and a second side cover 22b. The first side plate 21a and the second side plate 22a are coupled to each other via the connecting members 23. The first side plate 21a, second side plate 22a, and connecting members 23 are integrally formed, and form a frame of the reel body 2.

The first reel body portion 21 further comprises a protrusion 24. The protrusion 24 has a cylindrical shape, and protrudes axially outwardly. In particular, the protrusion 24 protrudes radially outwardly from the first cover 21b. Threads are formed on the outer perimeter surface of the protrusion 24. The adjustment member 6 is attached to this protrusion 24. In particular, the adjustment member 6 is screwed to the protrusion 24. The protrusion 24 communicates the housing space of the first reel body portion 21 with the outside. One of the ends of the spool shaft 4 is rotatably supported in the protrusion 24.

The spool 3 is disposed between the first reel body portion 21 and the second reel body portion 22. In particular, the spool 3 extends in the axial direction and has a substantially cylindrical shape. The spool 3 is rotatable relative to the reel body 2. The spool 3 is rotatably supported to the reel body 2 via the spool shaft 4.

The spool shaft 4 is integrally rotatable with the spool 3. The spool shaft 4 is rotatably supported by the first reel body portion 21 and the second reel body portion 22. The spool shaft 4 is rotatably supported by the first reel body portion 21 and the second reel body portion 22 via a first and second axle bearing members 12a, 12b.

Figure 3:
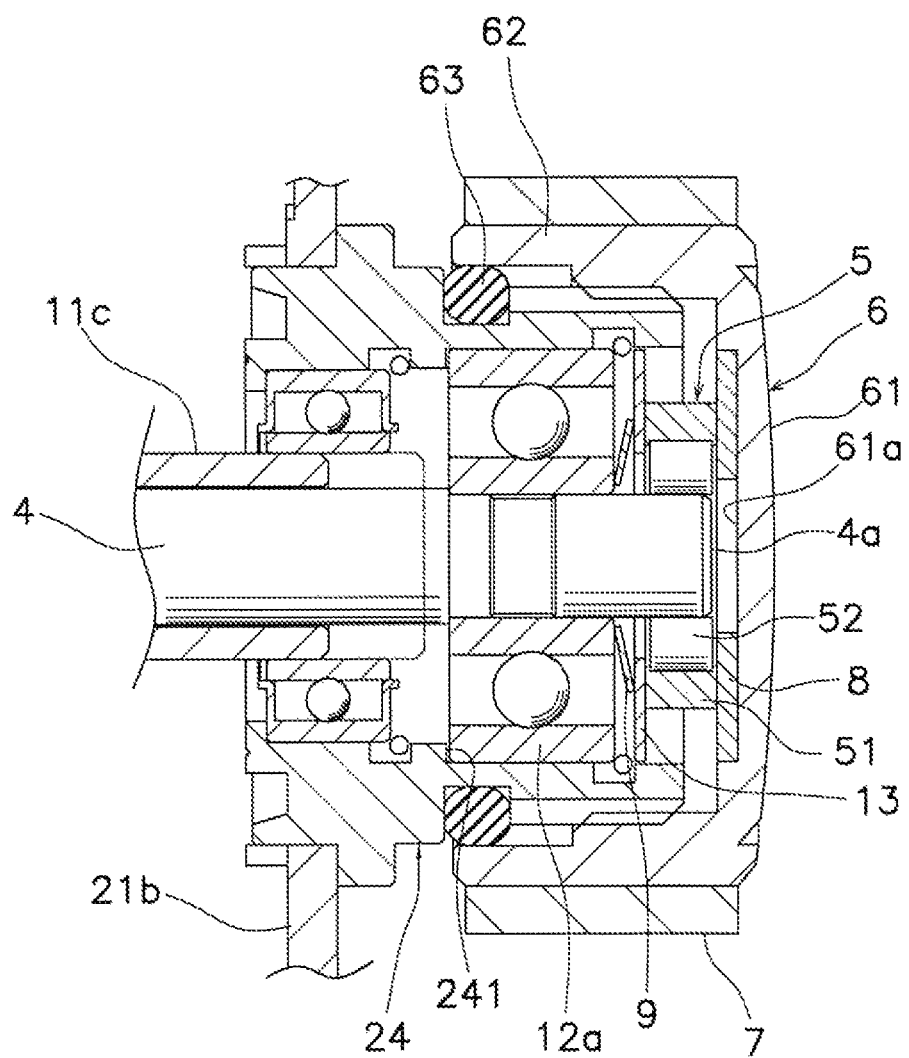
FIG. 3 is an exploded perspective view of the dual-bearing reel of FIG. 1.

As shown in FIG. 3, the one-way clutch 5 is attached to the spool 4. The one-way clutch 5 comprises an outer ring 51 and multiple rolling bodies 52. The outer ring 51 is rotatable relative to the reel body 2. In particular, the outer ring 51 is rotatable relative to the protrusion 24. The outer ring 51 is disposed with a gap between the inner perimeter surface of the protrusion 24.

The outer ring 51 is sandwiched between the first friction plate 8 and a second friction plate 13 in the axial direction. That is, the rotation of the outer ring 51 is braked by the first and second friction plates 8, 13.

The rolling body 52 is disposed between the spool shaft 4 and the outer ring 51. The rolling body 52 transmits the rotation of the spool shaft 4 in the casting direction to the outer ring 51. On the other hand, the rolling body 52 does not transmit the rotation of the spool shaft 4 in the reeling direction to the outer ring 51.

The adjustment member 6 is attached to the reel body 2. The adjustment member 6 is cylindrical in shape. In particular, the adjustment member 6 comprises a disc portion 61, and a cylindrical portion 62 that extends from the outer perimeter edge of the disc portion 61 in the axial direction. Threads are formed on the inner perimeter surface of the adjustment member 6. The adjustment member 6 is screwed to the protrusion 24 of the reel body 2. Accordingly, the adjustment member 6 moves in the axial direction when rotated around the axis.

The adjustment member 6 can adjust the braking force that brakes the rotation of the spool shaft 4. Meanwhile, in the present embodiment, when the spool shaft 4 is rotated in the line delivering direction, the spool shaft 4 and the outer ring 51 are rotated together. Accordingly, the adjustment member 6 can adjust the braking force that brakes the rotation of the spool shaft 4, by adjusting the braking force that brakes the rotation of the outer ring 51. Specifically, the force with which the adjustment member 6 presses the outer ring 51 can be adjusted, and the braking force that brakes the outer ring 51 can be adjusted, by rotating and moving the adjustment member 6 in the axial direction. Meanwhile, the adjustment member 6 presses the outer ring 51 via the first friction plate 8.

A seal member 63 is disposed between the inner perimeter surface of the adjustment member 6 and the outer perimeter surface of the protrusion 24. The seal member 63 prevents intrusion of foreign objects into the reel body 2. Further, the seal member 63 imparts rotational resistance to the adjustment member 6 so that the adjustment member 6 will not be rotated contrary to the intention of the angler.

The first friction plate 8 is disposed between the outer ring 51 of the one-way clutch 5 and the disc portion 61 of the adjustment member 6. The first friction plate 8 is an annular plate and is in contact with the outer ring 51. While in contact with the outer ring 51, the first friction plate 8 is not in contact with the rolling body 52. The first friction plate 8 is, for example, made of carbon cloth. The disc portion 61 of the adjustment member 6 presses the outer ring 51 in the axial direction via the first friction plate 8.

The biasing member 9 biases the outer ring 51 of the one-way clutch 5 toward the disc portion 61 of the adjustment member 6. That is, the biasing member 9 biases the outer ring 51 so that the outer ring 51 does not separate from the first friction plate 8. Meanwhile, the biasing member 9 biases the outer ring 51 via the second friction plate 13. The second friction plate 13 is an annular shape, and is in contact with the outer ring 51 of the one-way clutch 5. Meanwhile, the second friction plate 13 is not in contact with the rolling body 52.

The axial movement of the biasing member 9 in a direction away from the one-way clutch 5 is restricted. Specifically, the biasing member 9 is supported by the first axle bearing member 12a. The movement of this first axle bearing member 12a in a direction away from the one-way clutch 5 is restricted by a stepped portion 241 that is formed on the inner perimeter surface of the protrusion 24.

The biasing member 9 is, for example, a disc spring. The outer perimeter part of the biasing member 9 biases the outer ring 51 of the one-way clutch 5 via the second friction plate 13. Further, the inner perimeter part of the biasing member 9 is supported by the inner ring of the first axle bearing member 12a. Even if the biasing member 9 is completely compressed, the end surface 4a of the spool shaft 4 does not contact the bottom surface 61a of the adjustment member 6.

As shown in FIG. 1, the operating lever 7 is detachably attached to the adjustment member 6, and extends from the adjustment member 6 in the radial direction. Positional adjustment of the operating lever 7 is possible in the circumferential direction relative to the adjustment member 6. In particular, the operating lever 7 is attached to the adjustment member 6 so as to clamp the adjustment member 6 from the radially outer side. For example, the operating lever 7 comprises a cover portion 71, a lever portion 72, and a fastening member 73. The cover portion 71 and the lever portion 72 are integrally formed.

The cover portion 71 is C-shaped when viewed axially, and comprises first and second circumferential ends 71a, 71b. The first and second circumferential ends 71a, 71b are opposed to each other at an interval in the circumferential direction. This cover portion 71 covers the outer perimeter surface of the adjustment member 6. That is, the cover portion 71 is disposed along the outer perimeter surface of the adjustment member 6. The inner perimeter surface of the cover portion 71 and the outer perimeter surface of the adjustment member 6 are in contact.

The lever portion 72 extends from the cover portion 71 in the radial direction. In particular, the lever portion 72 extends rearward and upward. "Rearward" means the direction opposite to the direction in which the fishing line is unreeled (cast). "Upward" means the direction away from the fishing rod, when, the dual-bearing reel 100 is mounted to the fishing rod.

The lever portion 72 comprises a first lever portion 72a and a second lever portion 72b. The first lever portion 72a extends from a first circumferential end 71a in the radial direction, and the second lever portion 72b extends from a second circumferential end 72b in the radial direction. The first, lever portion 72a and the second lever portion 72b extend substantially in parallel and at an Interval from each other. The first lever portion 72a and the second lever portion 72b are coupled to each other at the distal ends thereof.

The fastening member 73 is attached across from the first lever portion 72a to the second lever portion 72b. The gap between the first lever portion 72a and the second lever portion 72b can be reduced by fastening the fastening member 73. As a result, the diameter of the cover portion 71 can become smaller, the operating lever 7 fastens the adjustment member 6, and the operating lever 7 can be fixed to the adjustment member 6. Further, the gap between the first lever 72a and the second lever 72b can be increased by loosening the fastening member 73. As a result, the diameter of the cover portion 71 can become larger, a gap is thereby formed between the operating lever 7 and the adjustment member 6, and the operating lever 7 can be rotated in the circumferential direction. Therefore, positional adjustment of the operating lever 7 becomes possible in the circumferential direction relative to the adjustment member 6.

As shown in FIG. 2, the handle 10 is a member for rotating the spool shaft 4, and is rotatably mounted to the first reel body portion 21. When the handle 10 is rotated, the spool shaft 4 is rotated via the rotation transmission mechanism 11.

The rotation transmission mechanism 11 is a mechanism for transmitting the rotation of the handle 10 to the spool shaft 4. The rotation transmission mechanism 11 comprises a drive shaft 11a, a drive gear 11b, a pinion gear 11c, and a clutch mechanism 11d. The drive shaft 11a is integrally rotated with the handle 10. The drive gear 11b is integrally rotated with the drive shaft 11a. The pinion gear 11c meshes with the drive gear 11b. The pinion gear 11c is a cylindrical shape, and the spool shaft 4 extends through the interior of the pinion gear 11c.

The clutch mechanism 11d transmits or cuts off the rotation of the pinion gear 11c to the spool shaft 4. Specifically, the clutch mechanism 11d is formed from an engagement pin 11e and an engagement recess 11f. The engagement pin 11e extends through the spool shaft 4 in the radial direction. The engagement recess 11f is a recess that is formed at one end of the pinion gear 11c. The rotation of the pinion gear 11c is transmitted to the spool shaft 4 by the engagement pin 11e being engaged with the engagement, recess 11f. On the other hand, when the engagement between the engagement pin 11e and the engagement recess 11f is released by the pinion gear 11c being moved in a direction away from the engagement pin 11e the rotation of the pinion gear 11c is not transmitted to the spool shaft 4.

Next, the operation of the dual-bearing reel 100 will be described. At the time of casting in which a fishing line is unreeled from the spool 3, the spool shaft 4 is rotated in the line delivering (casting) direction. The rotation of this spool shaft 4 in the casting direction is transmitted to the outer ring 51 via the rotating body 52 of the one-way clutch 5, thereby rotating the outer ring 51. The outer ring 51 is pressed by the adjustment member 6 via the first friction plate 8. That is, since the outer ring 51 is braked by the adjustment member 6, the rotational speed of the outer ring 51 is suppressed. Since the outer ring 51 and the spool shaft 4 are interlocked, the rotational speed of the spool shaft 4 at the time of casting is suppressed, and backlash is prevented.

When the operating lever 7 is pivoted, the adjustment member 6 is moved in the axial direction; therefore, the pressing force of the adjustment member 6 with respect to the outer ring 51 can be adjusted. That is, the braking force with respect to the spool shaft 4 can be adjusted by pivoting this operating lever 7.

Further, positional adjustment of the operating lever 7 is possible in the circumferential direction relative to the adjustment member 6. Accordingly, positional adjustment of the operating lever 7 is possible so that the operating lever 7 extends to a position that is easier to operate.

When winding the fishing line, the spool shaft 4 is rotated in the line winding (reeling) direction. The rolling body 52 does not transmit the rotation of the spool shaft 4 in the reeling direction to the outer ring 51. That is, the spool shaft 4 and the outer ring 51 will not be interlocked, and the braking force by the adjustment member 6 will not act on the spool shaft 4. Therefore, the rotational resistance by the adjustment member 6 will not be generated in the spool shaft 4 at the time of reeling, and the spool shaft 4 can be rotated smoothly.

One embodiment of the present invention was described above, but the present invention is not limited to the above-described embodiment, and various modifications can be made without departing from the scope of the invention.

Modified Example 1

Figure 4:
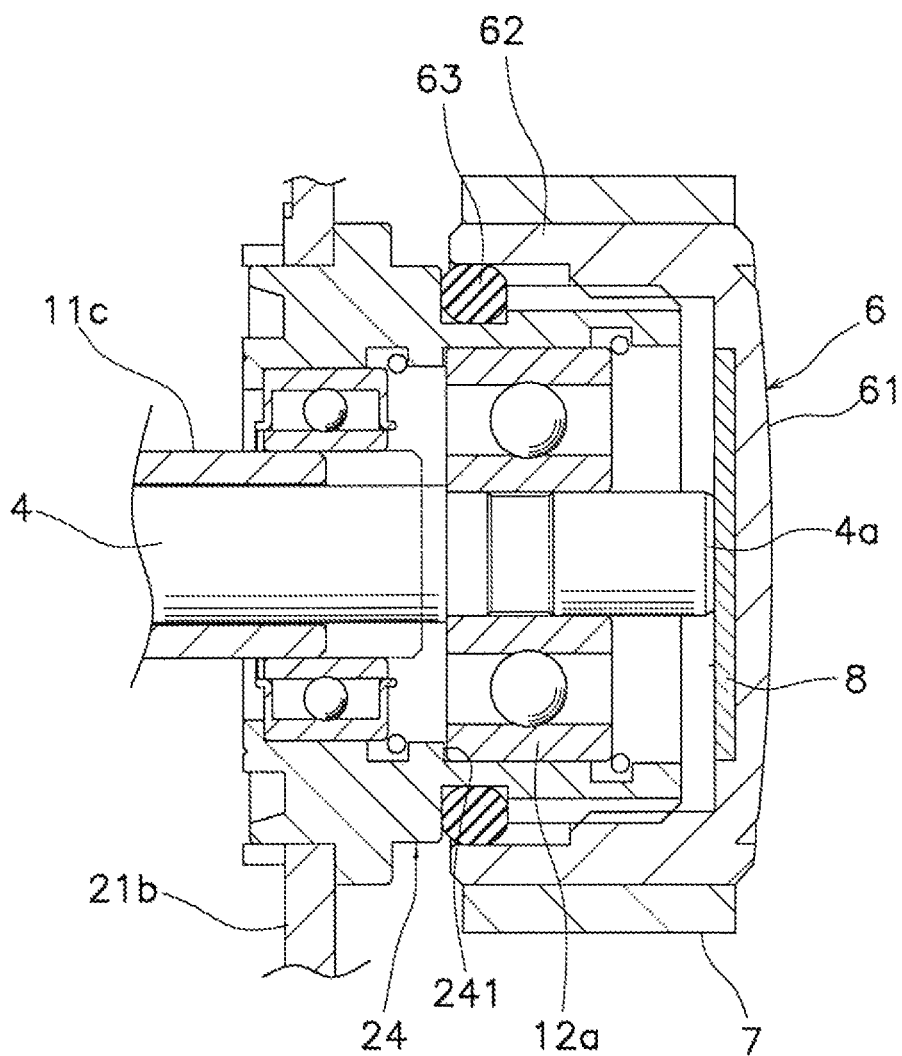
FIG. 4 is an enlarged cross-sectional view of the dual-bearing reel of FIG. 1.

In the above-described embodiment, the adjustment member 6 brakes the rotation of the spool shaft 4 via the one-way clutch 5, but may omit the one-way clutch 5 and directly brake the rotation of the spool shaft 4. For example, as shown in FIG. 4, the first friction plate 8 may contact the end surface 4a of the spool shaft 4.

Modified Example 2

Figure 5:
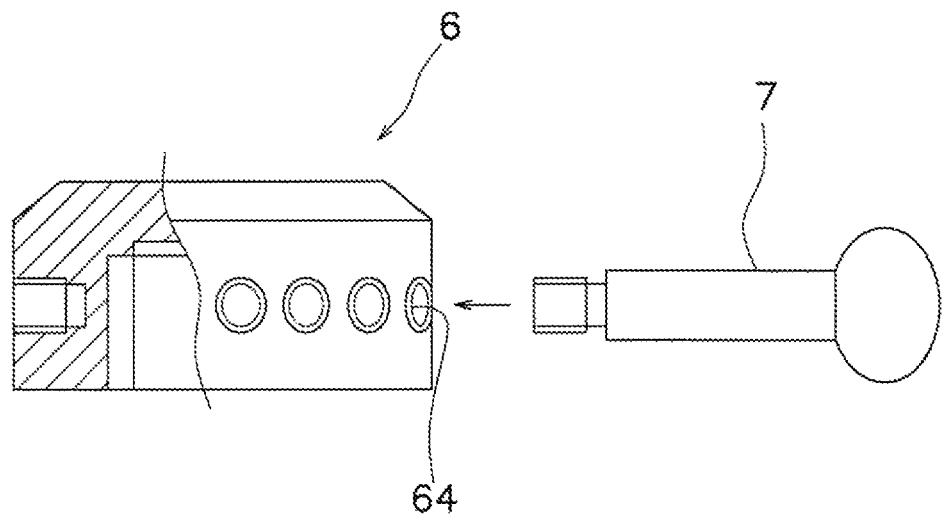
FIG. 5 is an enlarged cross-sectional view of a dual-bearing reel according to a modified example.
Figure 6:
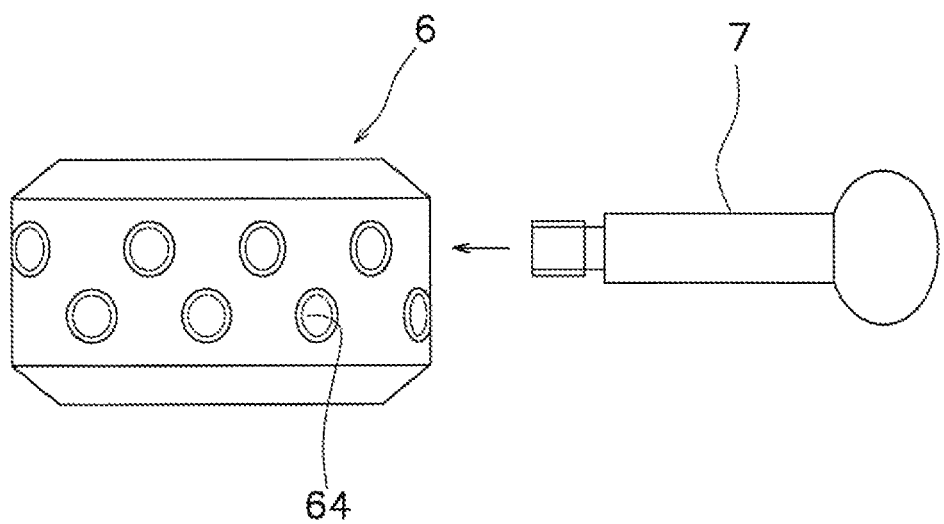
FIG. 6 is a perspective view of the dual-bearing reel according to the modified example.

As shown in FIG. 5, the adjustment member 6 according to the second modified example comprises multiple recesses 64. Each recess 64 is formed on the outer perimeter surface of the cylindrical portion 62. The recesses 64 are disposed at intervals from each other in the circumferential direction. The operating lever 7 may be attached to each recess 64. Specifically, the operating lever 7 is screwed to each recess 64. Further, as shown in FIG. 6, the recesses 64 can be arranged in a staggered manner in the circumferential direction. According to the above, the position of the operating lever 7 in the circumferential direction becomes adjustable at a finer pitch.

Modified Example 3

Figure 7:
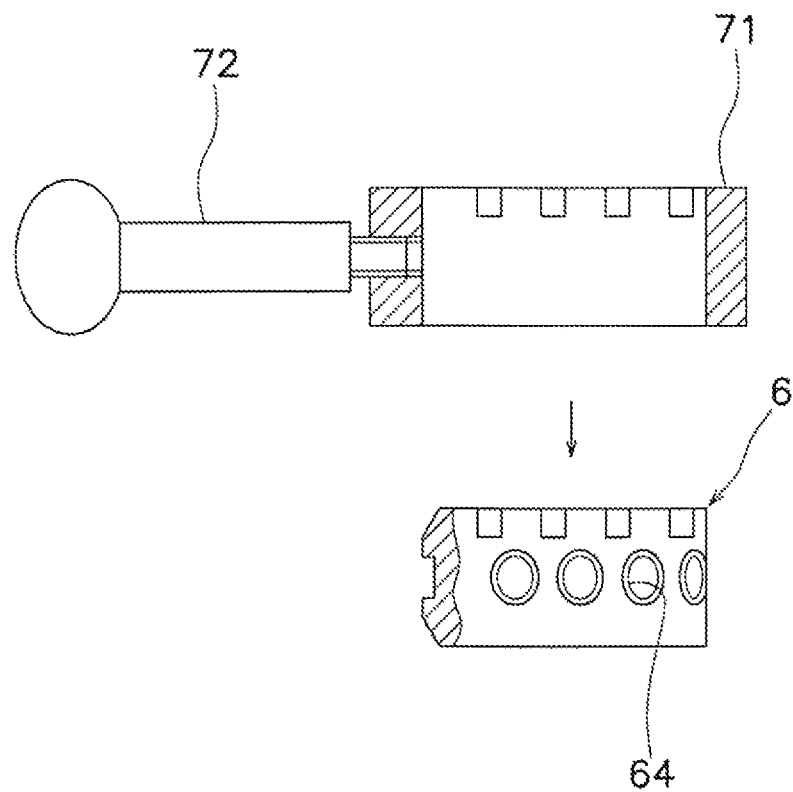
FIG. 7 is a cross-sectional view of an operating lever according to a modified example.

As shown in FIG. 7, in a dual-bearing reel according to the third modified example, the adjustment member 6 comprises multiple recesses 64 on the outer perimeter surface thereof. Then, the cover portion 71 of the operating lever 7 is attached so as to cover the outer perimeter surface of the adjustment member 6. It is possible to prevent foreign objects from clogging the recesses 64 by the cover portion 71 covering the recesses 64. Further, the cover portion 71 and the lever portion 72 are separate members from each other. The lever portion 72 is attached to the cover portion 71 by being screwed to the cover portion 71. Further, one end of the lever portion 72 extends through the cover portion 71 and engages the recesses 64.

Modified Example 4

Figure 8:
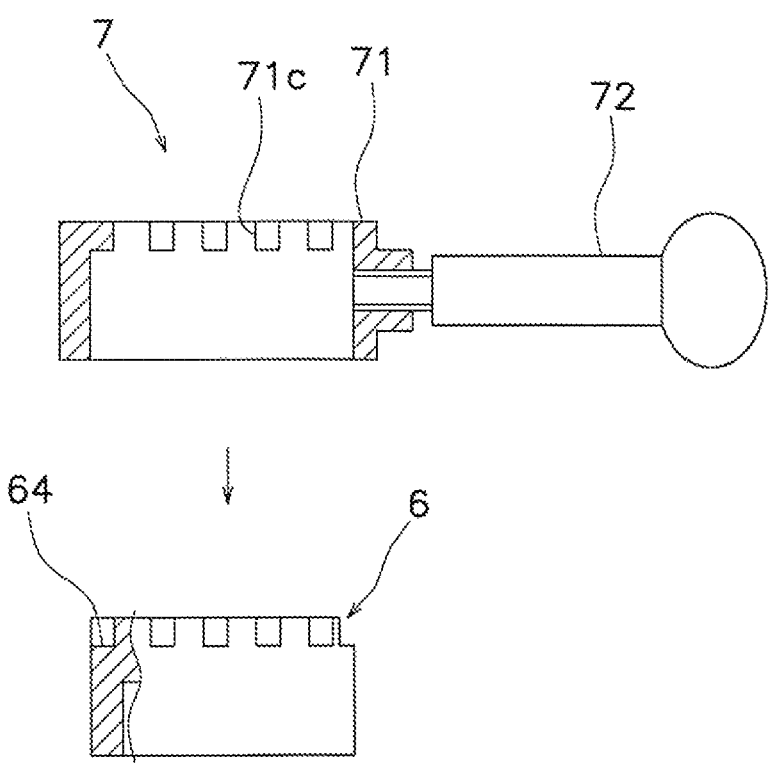
FIG. 8 is a cross-sectional view of an operating lever according to a modified example.

As shown in FIG. 8, an adjustment member 6 according to the fourth modified example comprises multiple recesses 64 arranged at intervals in the circumferential direction on the outer perimeter surface thereof. The cover portion 71 of the operating lever 7 comprises multiple protrusions 71c that engage the recesses 64 on the inner perimeter surface thereof.

Modified Example 5

Figure 9:
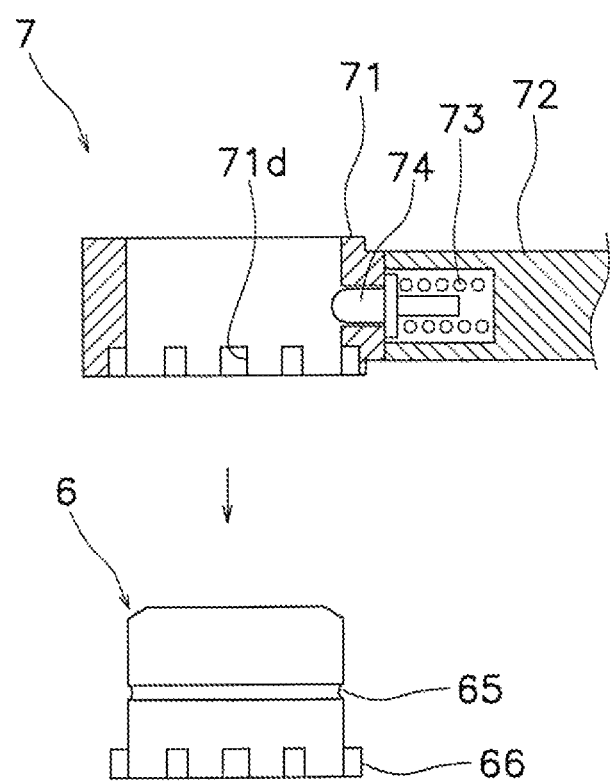
FIG. 9 is a cross-sectional view of art operating lever according to a modified example.

As shown in FIG. 9, an adjustment member 6 according to the fifth modified example, comprises an annular groove portion 65 extending in the circumferential direction. The groove portion 65 is formed on the outer perimeter surface of the cylindrical portion 62 of the adjustment member 6. The operating lever 7 further comprises a cover portion 71, a lever portion 72, a pin 74, and a biasing part 75. The pin 74 is configured to be engaged with the groove portion 65. That is, the pin 74 protrudes from the inner perimeter surface of the cover portion 71 radially inwardly. The biasing part 75 biases the pin 74 toward the groove portion 65. The biasing part 75 is, for example, a coil spring. Since the pin 74 is biased by the biasing part 73 while being engaged with the groove portion 65, it is possible to suppress the operating lever 7 from being detached from the adjustment member 6 in the axial direction. Meanwhile, the cover portion 71 comprises multiple recesses 71d disposed at intervals in the circumferential direction. The adjustment member 6 comprises multiple protrusion 66 that engage with each recess 71d on the outer perimeter surface thereof.

Modified Example 6

Figure 10:
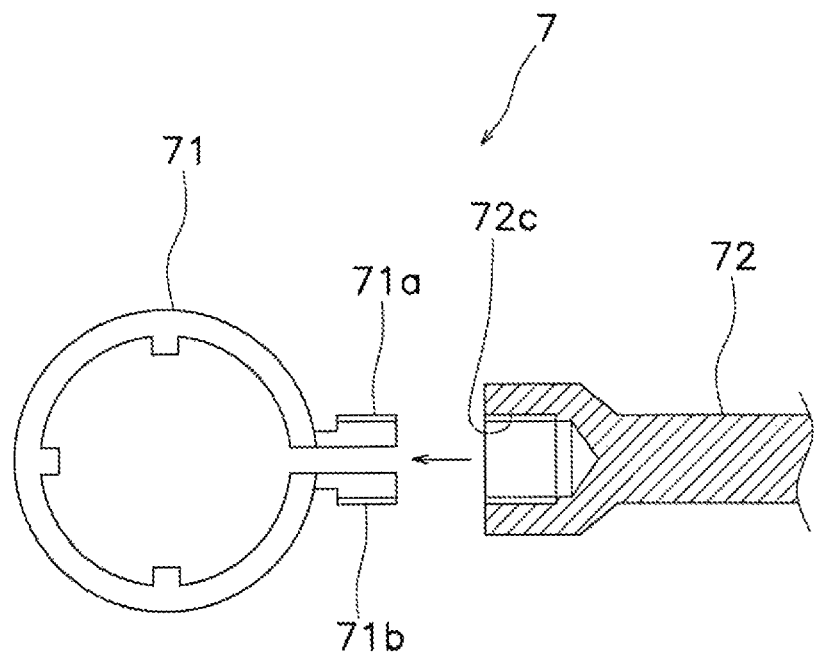
FIG. 10 is a cross-sectional view of an operating lever according to a modified example.

As shown in FIG. 10, in the operating lever 7 according to the seventh modified example, the cover portion 71 and the lever portion 72 are separate members. The cover portion 71 is C-shaped when viewed axially, and comprises a pair of circumferential ends 71a, 71b. The lever portion 72 is attached to the pair of circumferential ends 71a, 71b so that the pair of circumferential ends 71a, 71b approach each other.

In particular, the proximal end portion of the lever portion 72 comprises a screw hole 72c. Then, the pair of circumferential ends 71a, 71b form a male threaded portion, which is screwed to the screw hole 72c. By screwing this pair of circumferential ends 71a, 71b and the screw hole 72c, the pair of circumferential ends 71a, 71b approach each other in the circumferential direction. That is, the diameter of the cover portion 71 is reduced. Accordingly, the cover portion 71 is attached to the adjustment member 6 so as to clamp the adjustment member 6.

Figure 11:
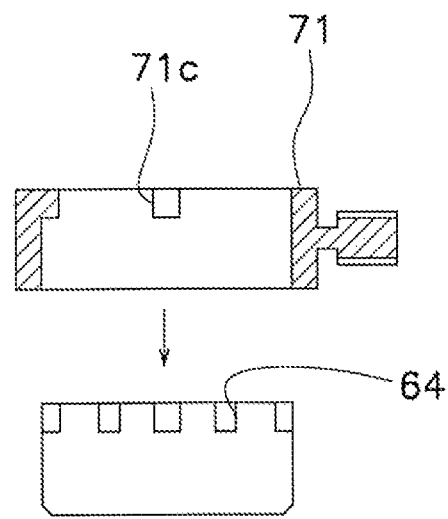
FIG. 11 is a cross-sectional view of an operating lever according to a modified example.

Meanwhile, as shown in FIG. 11, the adjustment member 6 comprises multiple recesses 64 disposed at intervals in the circumferential direction, and the cover portion 71 comprises a protrusion 71e that engages with each recess 64.

Modified Example 7

Figure 12:
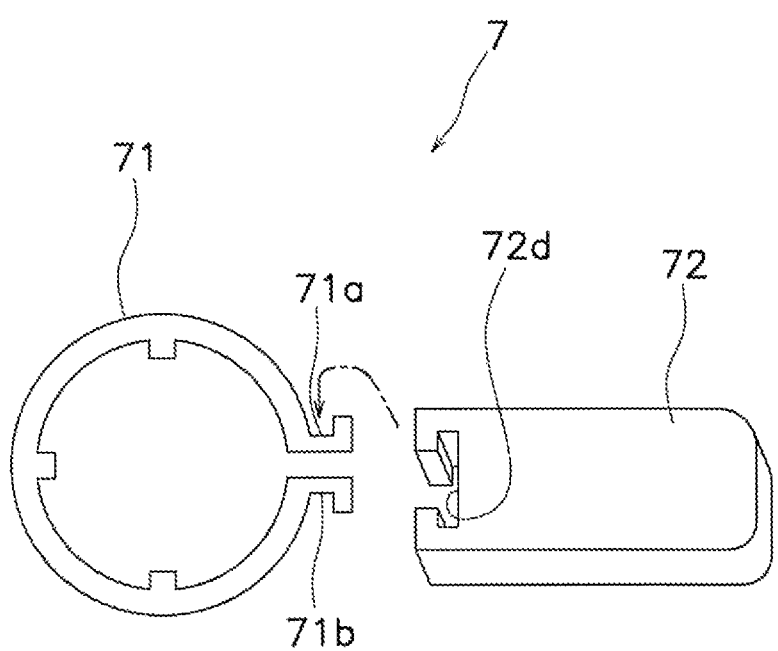
FIG. 12 is a cross-sectional view of an operating lever according to a modified example.

As shown in FIG. 12, the pair of circumferential ends 71a, 71b of the cover portion 71 may be shaped so as to engage an engagement recess 72d of the lever portion 72. With this configuration as well, the pair of circumferential ends 71a, 71b can approach each other by attaching the lever portion 72 to the pair of circumferential ends 71a, 71b. That is, by attaching the lever portion 72 to the pair of circumferential ends 71a, 71b, the diameter of the cover portion 71 is reduced; as a result, the cover portion 71 is capable of fastening the adjustment member 6.

Modified Example 8

Figure 13:
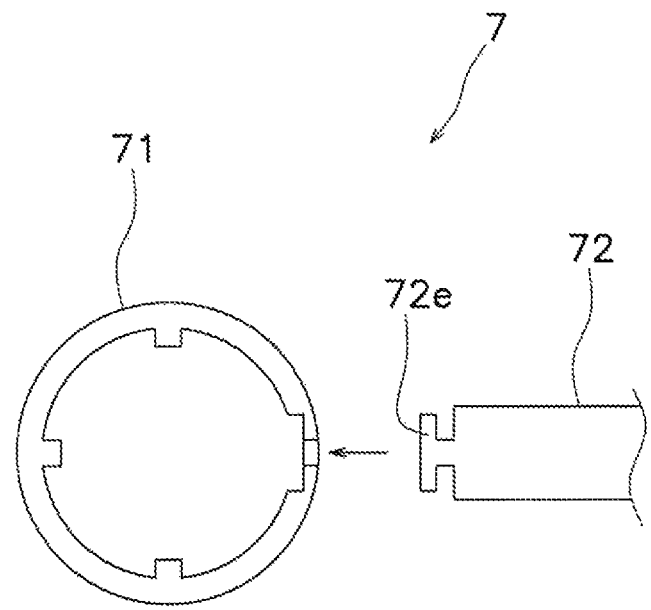
FIG. 13 is a cross-sectional view of an operating lever according to a modified example.
Figure 14:
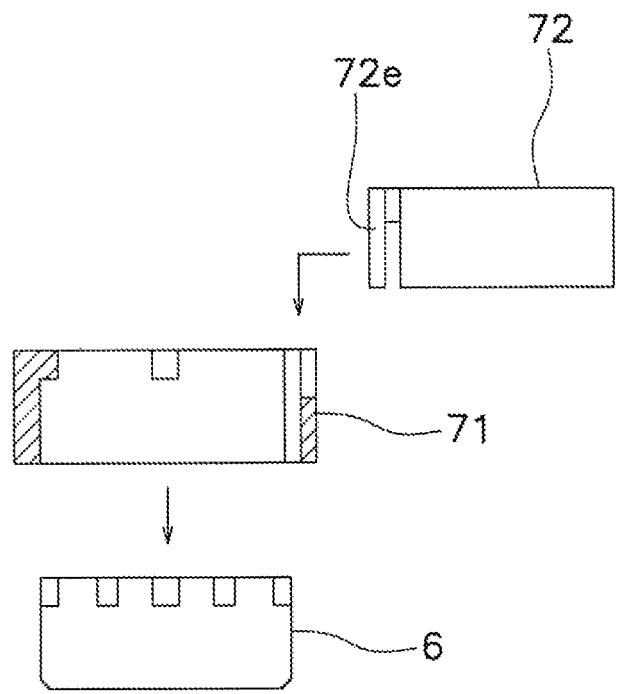
FIG. 14 is a cross-sectional view of an operating lever according to a modified example.

As shown in FIG. 13 and FIG. 14, the lever portion 72 may comprise a fitting part 72e. The fitting pan 72e is fitted in the gap between the cover portion 71 and the adjustment member 6. The cover portion 71 is thereby fixed to the adjustment member 6.

Modified Example 9

Figure 15:
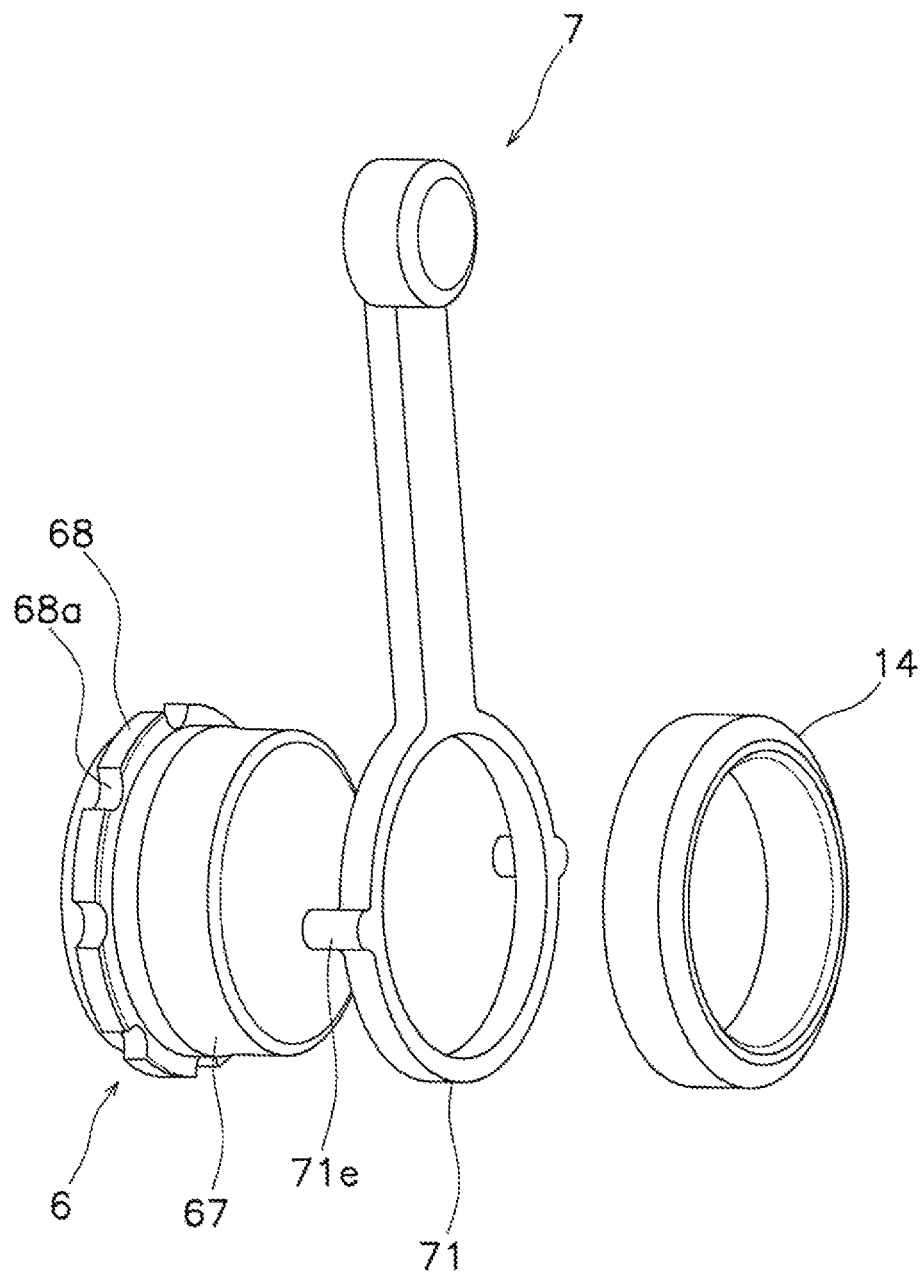
FIG. 15 is a cross-sectional view of an operating lever according to a modified example.

As shown in FIG. 15, the dual-bearing reel may further comprise an annular female screw member 14. In this case, the adjustment member 6 comprises a male threaded portion 67 on the outer perimeter surface thereof. This male threaded portion 67 and the female screw member 14 are screwed to each other. Further, the adjustment member 6 comprises a flange 68. The operating lever 7 is sandwiched (or disposed) between the flange 68 and the female screw member 14. In particular, the cover portion 71 of the operating lever 7 is sandwiched by the flan 68 and the female screw member 14.

The flange 68 comprises multiple recesses 68a. The recesses 68a are disposed at intervals in the circumferential direction. The operating lever 7 comprises at least one protrusion 71c that engages with each recess 69a. It is possible to prevent the operating lever 7 from rotating in the circumferential direction by the protrusion 71e engaging the recess 68a.

Modified Example 10

In the above-described embodiments and modified examples, the adjustment member 6 is attached to the first reel body portion 21, but the adjustment member may be attached to the second reel body portion 22 as well. Since the operating lever 7 is attached to the adjustment member 6, the operating lever 7 is also disposed on the second reel body portion 22 side. Meanwhile, the adjustment member 6 and the operating lever 7 may be arranged inside the second reel body portion 22 as well. In this case, a portion of the operating lever 7 is exposed from the outer perimeter surface of the second reel body portion 22.

What is claimed is:

1. A dual-bearing reel, comprising:
a reel body;
a spool rotatable relative to the reel body;
a spool shaft configured to integrally rotate with the spool;
an adjustment member attached to the reel body and configured to adjust a braking force that brakes the rotation of the spool shaft; and
an operating lever detachably attached to the adjustment member so as to extend in a radial direction, and adjustably attached to the adjustment member in a circumferential direction relative to the adjustment member.

2. The dual-bearing reel recited in claim 1, wherein the operating lever is attached to the adjustment member so as to clamp the adjustment member from a radially outer side.

3. The dual-bearing reel recited in claim 1, wherein the adjustment member comprises a plurality of recesses disposed at intervals in the circumferential direction on an outer perimeter surface thereof, and
the operating lever is configured to attach to at least one of the plurality of recesses.

4. The dual-bearing reel recited in claim 3, wherein the plurality of recesses are arranged in a staggered manner in the circumferential direction.

5. The dual-bearing reel recited in claim 1, wherein the operating lever comprises a cover portion attached so as to cover an outer perimeter surface of the adjustment member, and
a lever portion extending from the cover portion in the radial direction.

6. The dual-bearing reel recited in claim 5, wherein the adjustment member comprises a plurality of recesses disposed at intervals in the circumferential direction on the outer perimeter surface, and
one end of the lever portion is configured to extend through the cover portion and engage each recess of the plurality of recesses.

7. The dual-bearing reel recited in claim 5, wherein the adjustment member comprises a plurality of recesses disposed at intervals in the circumferential direction, and
the cover portion comprises at least one protrusion that engages at least one of the plurality of recesses.

8. The dual-bearing reel recited in claim 5, wherein the cover portion comprises a plurality of recesses disposed at intervals in the circumferential direction, and
the adjustment member comprises at least one protrusion that engages at least one of the plurality of recesses.

9. The dual-bearing reel recited in claim 5, wherein the lever portion is screwed to the cover portion.

10. The dual-bearing reel recited in claim 5, wherein the adjustment member comprises a groove portion extending in the circumferential direction on the outer perimeter surface, and
the operating lever further comprises a pin configured to engage the groove portion, and
a biasing part configured to bias the pin toward the groove portion.

11. The dual-bearing reel recited in claim 5, wherein the cover portion comprises a pair of circumferential ends, the pair of circumferential ends being C-shaped when viewed axially, and
the lever portion is attached to the pair of circumferential ends so that the pair of circumferential ends approach each other.

12. The dual-bearing reel recited in claim 5, wherein the lever portion comprises a fitting part fitted between the cover portion and the adjustment member.

13. The dual-bearing reel recited in claim 1, further comprising
an annular female screw member,
the adjustment member comprises a male threaded portion to which the female screw member is screwed and a flange, and
the operating lever is disposed between the female screw member and the flange.

14. The dual-bearing reel recited in claim 13, wherein the flange comprises a plurality of recesses disposed at intervals in the circumferential direction, and
the operating lever comprises at least one protrusion that engages each recess of the plurality of recesses.

15. The dual-bearing reel recited in claim 1, further comprising
- a one-way clutch comprising an outer ring that is rotatable relative to the reel body and a rolling body configured to transmit rotation of the spool shaft in a casting direction to the outer ring, the one-way clutch being attached to the spool shaft, and
- the adjustment member is configured to adjust the braking force that brakes the rotation of the outer ring.

* * * * *